United States Patent
Mueller et al.

(10) Patent No.: US 7,299,676 B1
(45) Date of Patent: Nov. 27, 2007

(54) ACOUSTIC PRESSURE CALIBRATOR

(75) Inventors: Guenther Mueller, Maitenbeth (DE); Joseph Steigenberger, Bad Toelz (DE)

(73) Assignee: EADS Deutschland GmbH, Munich (DE)

(*) Notice: Subject to any disclaimer, the term of this patent is extended or adjusted under 35 U.S.C. 154(b) by 97 days.

(21) Appl. No.: 10/089,735

(22) PCT Filed: Oct. 2, 2000

(86) PCT No.: PCT/DE00/03478

§ 371 (c)(1),
(2), (4) Date: Apr. 4, 2002

(87) PCT Pub. No.: WO01/25735

PCT Pub. Date: Apr. 12, 2001

(30) Foreign Application Priority Data

Oct. 5, 1999 (DE) .................. 199 47 683

(51) Int. Cl.
G01M 1/14 (2006.01)
G01N 29/00 (2006.01)

(52) U.S. Cl. .................. 73/1.82; 73/1.71

(58) Field of Classification Search .............. 73/182, 73/584, 589; 702/54
See application file for complete search history.

(56) References Cited

U.S. PATENT DOCUMENTS 4,445,378 A * 5/1984 Zuckerwar .................. 73/589
4,715,219 A * 12/1987 Frederiksen .................. 73/1.82
4,909,064 A * 3/1990 Talmadge .................. 73/1.82
5,567,863 A 10/1996 Larson et al.

FOREIGN PATENT DOCUMENTS

| DE | 42 17 624 | 3/1992 |
| EP | 0 006 833 | 1/1980 |
| JP | 05049097 | 2/1993 |

OTHER PUBLICATIONS

PTO 05-1000, "Large Sound Pressure Provision Device For Measuring And Calibrating Microphone Characteristic", English Language Translation of Japanese Published Unexamined Patent Application JP 05049097 A of Feb. 26, 1993.*
International Search Report.
Barham, R. G., "The NPL Laser Pistonphone", Journal of Low Frequency Noise & Vibration, pp. 36-38, 1993, UK.

* cited by examiner

*Primary Examiner*—Hezron Williams
*Assistant Examiner*—Samir M. Shah
(74) *Attorney, Agent, or Firm*—Crowell & Moring LLP

(57) ABSTRACT

A sound pressure level calibrator, which is suitable for sound pressures to be measured in excess of 124 dB and which can be adapted to the installed sound pressure level sensor. This object is attained by a sound pressure level calibrator comprising a pistonphone and a high-pressure adapter connected to the output of the pistonphone. The high-pressure adapter acts as a resonator. With an expanded adapter opening the high-pressure adapter is connected in sound-proof manner with the sound pressure level sensor, which is inserted into a structure. The invention can be used for a sound pressure level calibrator to calibrate a sound pressure level sensor, which is integrated into a structure.

5 Claims, 1 Drawing Sheet

ACOUSTIC PRESSURE CALIBRATOR

BACKGROUND AND SUMMARY OF THE INVENTION

This application claims the priority of German Application DE 199 47 6837, filed Oct. 5, 1999, and PCT/DE00/03478, filed Oct. 2, 2000, the disclosure of which is expressly incorporated by reference herein.

The invention relates to a sound pressure level calibrator. The calibration of sound pressure level sensors is generally carried out with commercially available sound pressure level calibrators that can produce a maximum sound pressure of 94 dB or 124 dB. To measure sound pressure levels, calibration must be conducted with levels that are nearly as high as the levels to be measured in order to achieve the required measuring accuracy and to be able to check the required dynamics of the recording device of the measuring chain, e.g., a tape recorder, for optimum level control of the recording device. The sound pressure level of commercially available sound pressure level calibrators, which is limited in height, cannot always meet these requirements.

Furthermore, the sound pressure level calibrators of the prior art require the removal for calibration of the sound pressure level sensor from its supporting structure to adapt it to the commercially available sound pressure level calibrators. In prolonged measuring tests with frequent calibration processes, this required removal is very time-consuming and labor intensive. The frequent installation and removal also involves the risk that the sensitive sound pressure level sensor may be damaged.

The object of the invention is to provide a sound pressure level calibrator that is suitable for sound levels to be measured in excess of 124 dB and that can be adapted to the installed sound pressure level sensor.

The solution according to the invention is based on a high-pressure adapter on a commercially available pistonphone, which advantageously acoustically amplifies the sound pressure emitted by the pistonphone to values >150 dB and permits the in situ calibration of the sound pressure level sensor.

This makes it possible to conduct calibration in situ immediately prior to the start of the measuring process on the entire measuring chain and to take measurements with relatively high accuracy even if the sound pressure levels are high. In addition, the adapter advantageously permits the calibration of different sound pressure level sensors through adaptation modules.

Other objects, advantages and novel features of the present invention will become apparent from the following detailed description of the invention when considered in conjunction with the accompanying drawings.

BRIEF DESCRIPTION OF THE DRAWINGS

With reference to the drawing, an exemplary embodiment of the invention will now be described in greater detail. The FIGURE is a schematic sketch of the sound pressure level calibrator according to the invention.

DETAILED DESCRIPTION OF THE PREFERRED EMBODIMENT

Figure 1:
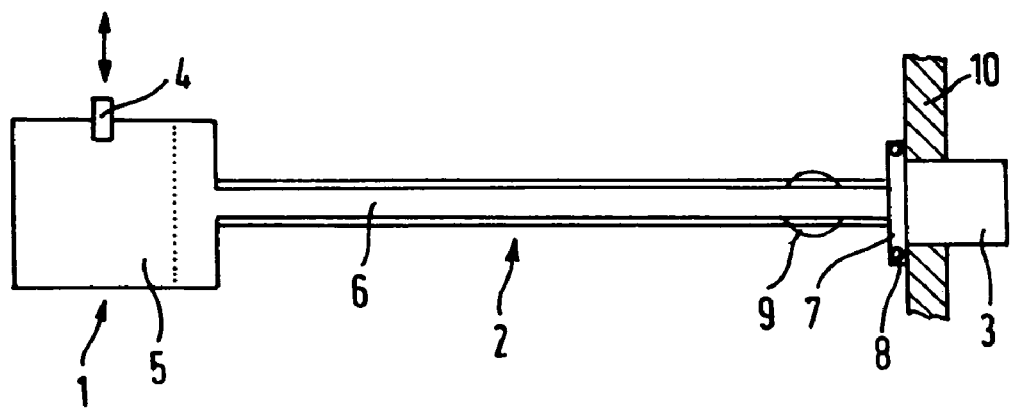

The sound pressure level calibrator depicted in the FIGURE comprises a pistonphone 1, a high-pressure adapter 2 connected to the output of the pistonphone, and a sound pressure level sensor 3.

The pistonphone 2 has a piston 4 for producing sound pressure and an adjustable pistonphone volume 5. The high-pressure adapter 2 comprises a $\lambda/4$ resonator 6 with an expanded adapter opening 7 for a soundproof connection of the high-pressure adapter to the sound pressure level sensor 3 by means of a sealing ring 8. A mechanical compensation link 9 is integrated into the high-pressure adapter 2. In contrast to a rigid design of the high-pressure adapter 2, this compensation link simplifies the soundproof connection between the high-pressure adapter 2 and the sound pressure level sensor 3 if the components are not completely aligned. The sound pressure level sensor 3 remains in its structure 10 during calibration. For static pressure, the pistonphone volume 5 is ventilated via a resistance bore. The $\lambda/4$ resonator 6 is embodied as a tube with a constant diameter.

In pistonphone 1, the adjustable pistonphone volume 5 is sinusoidally compressed with frequency f by piston 4, and the $\lambda/4$ resonator tube is excited by the dynamic pressure fluctuations produced thereby. The high-pressure adapter 2 embodied as a $\lambda/4$ resonator amplifies the sound pressure produced in the pistonphone volume and, via its adapter opening 7, applies this amplified sound pressure to the sound pressure level sensor 3.

The adjustable pistonphone volume 5 and the length of the $\lambda/4$ resonator 6 can be tuned to one another by mechanical means such that the acoustic coupling effect and thus the amplification of the $\lambda/4$ resonator 6 is established at a maximum. The executed fine-tuning can be locked by mechanical means. The constructional means for executing tuning and locking are accessible to the person skilled in the art without requiring an inventive step and their embodiment is therefore not further described here.

The physical relationships (G1) to (G4) listed below may be used as an approximate basis for the design of the sound pressure level calibrator.

$$p = \frac{\chi \cdot P_o \cdot s \cdot l}{2V}$$

$p_I$ dynamic pressure in the pistonphone volume $\chi$ kappa air $p_o$ static air pressure in the environment s piston area l piston amplitude (tip to tip)

V pistonphone volume $$P1 = \frac{p_i \cdot 2 \cdot \pi \cdot f_a \cdot \rho \cdot L_e}{4\left(1 + 0.4 \frac{L}{2R}\right)\sqrt{\rho \cdot \pi \cdot v \cdot f_a}}$$

P1 dynamic pressure on the sensor-side output of the $\lambda/4$ resonator $p_I$ dynamic pressure in the pistonphone volume $f_A$ excitation frequency on the piston $\rho$ density of the air L length of the resonator tube $L_e$ effective length of the $\lambda/4$ resonator (approximately 0.58 L)

R radius of the λ/4 resonator

ν dynamic viscosity of the air $$P2 = P1 \frac{d^2}{D^2}$$

P2 dynamic pressure at the membrane of the sound pressure level sensor

P1 dynamic pressure on the sensor-side output of the λ/4 resonator d diameter of the λ/4 resonator D diameter of the adapter opening For a selected excitation frequency of $f_A$=314 Hz, the above equations G1 to G3 can be used to estimate the sound pressure level P2 at the membrane of the sound pressure level sensor at: 152.8 dB re. 2E-5 Pa. The actual tube length, due to the additional spring effect of the pistonphone volume, which occurs parallel to the spring effect of the λ/4 resonator, must be designed greater than the tube length L theoretically resulting from the excitation frequency $f_A$, so that resonance occurs between the excitation frequency $f_A$ and the vibration system. The actual tube length L for the λ/4 resonator results from the selected frequency f of the vibration system and the adaptation of the spring constant k2.

$$f = \frac{1}{2\pi} \sqrt{\frac{k1 + k2}{M}}$$

f frequency of the vibration system at resonance k1 spring constant of the pistonphone volume k2 spring constant of the λ/4 resonator M vibrating mass of the λ/4 resonator The control measurement of a sound pressure level calibrator designed in accordance with equations G1 to G4 for the selected excitation frequency $F_A$=314 Hz resulted in a sound pressure level of 151.3 dB. This measured value is lower than the value of 152.8 dB resulting from equations G1 to G4, which is attributable to boundary and friction influences. However, the equations G1 to G4 reflect well the obtainable order of magnitude for the sound pressure level at the sound pressure level calibrator according to the invention.

The reproducibility of the sound pressure level calibrator according to the invention by means of a measurement series extending over 24 days results in a deviation from the mean value of the measured sound pressure level of approximately +/-0.3 dB. These deviations are partly attributable to air pressure and temperature changes, which were not corrected when the measurement series was recorded.

The above measurement results for level amplification and reproducibility are determined with piezo transducers. If sound pressure level sensors with softer measurement membranes are calibrated, the achievable level amplifications will be somewhat lower.

The sound pressure level calibrator is adjusted in the laboratory by means of a calibrated measuring chain, which corresponds to the sound pressure level sensor to be calibrated and has comparable installation conditions.

The invention claimed is:

1. A sound pressure level calibrating a sound pressure level sensor comprising:
   a pistonphone having a piston and an adjustable pistonphone volume for producing a sound pressure with a selected excitation frequency;
   and a high-pressure adapter, which is connected to an output of the pistonphone volume; wherein
   the high-pressure adapter includes a tube formed as a λ/4 resonator having a length which is adapted to the excitation frequency of the pistonphone to amplify the sound pressure produced in the pistonphone volume and an expanded adapter opening with a sealing ring for a soundproof connection to said sound pressure level sensor to be calibrated.

2. The sound pressure level calibrator as claimed in claim 1, wherein the resonator is a tube of a length (L) with a constant diameter (d).

3. The sound pressure level calibrator as claimed in claim 1, wherein the high pressure adapter, further includes an integral mechanical compensation link in order to improve the soundproof connection of high pressure adapter to the sound pressure level sensor.

4. A method for calibrating a sound pressure level sensor comprising the steps of:
   providing a pistonphone having a piston and an adjustable pistonphone volume for producing a sound pressure with a selected excitation frequency;
   amplifying the produced sound pressure by means of a high-pressure adapter which includes a tube formed a λ/4 resonator having a length which is adapted to the excitation frequency of the pistonphone to amplify the sound pressure produced in the pistonphone volume, and an expanded adapter opening with a sealing ring in order to provide soundproof connection to said sound pressure level sensor to be calibrated.

5. The method according to claim 4, further comprising the step of forming a mechanical compensation link integral with the high pressure adapter in order to improve the soundproof connection of the high pressure adapter to the sound pressure level sensor.

* * * * *